United States Patent [19]

Dluhosch

[11] Patent Number: 4,510,739
[45] Date of Patent: Apr. 16, 1985

[54] LAWN MOWER

[75] Inventor: Kurt Dluhosch, Schweinfurt, Fed. Rep. of Germany

[73] Assignee: Fichtel & Sachs Ag, Schweinfurt, Fed. Rep. of Germany

[21] Appl. No.: 516,116

[22] Filed: Jul. 20, 1983

[30] Foreign Application Priority Data

Jul. 23, 1982 [DE] Fed. Rep. of Germany ... 8221022[U]

[51] Int. Cl.³ .............................................. A01D 53/02
[52] U.S. Cl. ..................................... 56/17.5; 56/12.8; 123/195 C; 123/198 DC; 123/198 DB; 123/41.11
[58] Field of Search ...................... 56/12.8, 16.8, 17.5, 56/320.1; 123/198 E, 195 C, 195 S, 198 D, 198 DB, 198 DC, 195 R, 41.11

[56] References Cited

U.S. PATENT DOCUMENTS 4,211,058  7/1980  Larsen .................................. 56/320.1

FOREIGN PATENT DOCUMENTS

| 32968 | 8/1981 | European Pat. Off. ............ 56/320.1 |
| 1944645 | 4/1971 | Fed. Rep. of Germany ....... 56/17.5 |
| 2151187 | 4/1973 | Fed. Rep. of Germany ... 123/198 E |
| 2519842 | 11/1976 | Fed. Rep. of Germany ..... 56/320.1 |
| 2730218 | 1/1979 | Fed. Rep. of Germany ....... 56/17.5 |
| 2083733 | 3/1982 | United Kingdom ............... 56/320.1 |

Primary Examiner—Hugh R. Chamblee
Assistant Examiner—John G. Weiss
Attorney, Agent, or Firm—Toren, McGeady and Stanger

[57] ABSTRACT

The lawn mower comprises a vertical cutter shaft which is driven by an internal combustion engine its upper housing is formed as synthetic plastics moulding and combines a fuel tank, a carburettor and an air suction silencer into one construction unit which is secured as a unit on the internal combustion engine. A fuel passage between the fuel tank and the carburettor is formed into the housing. In the path of the fuel supply there is arranged a fuel shut-off valve the valve body of which carries a segment disc serving as choke flap of the carburettor.

9 Claims, 5 Drawing Figures

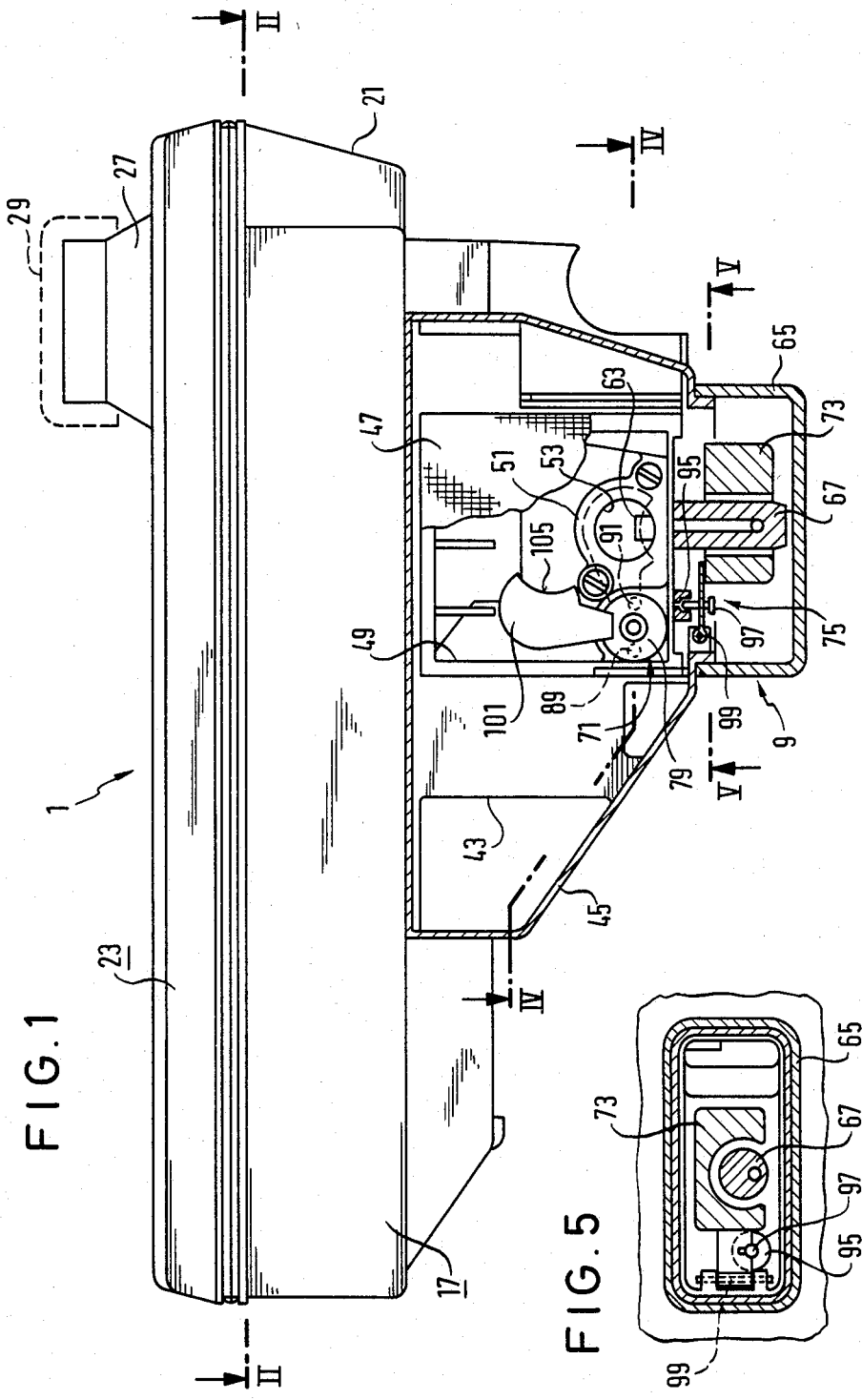

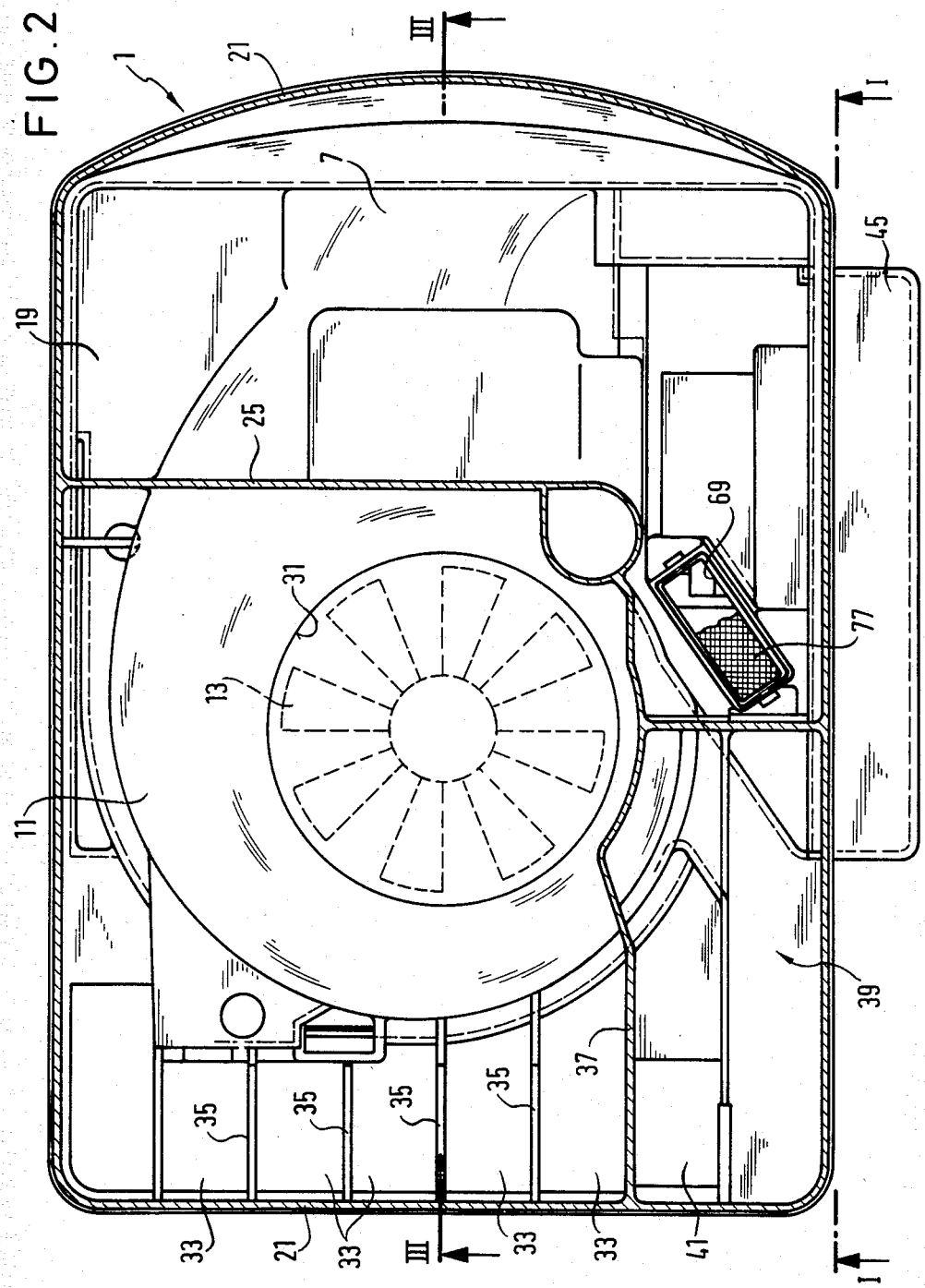

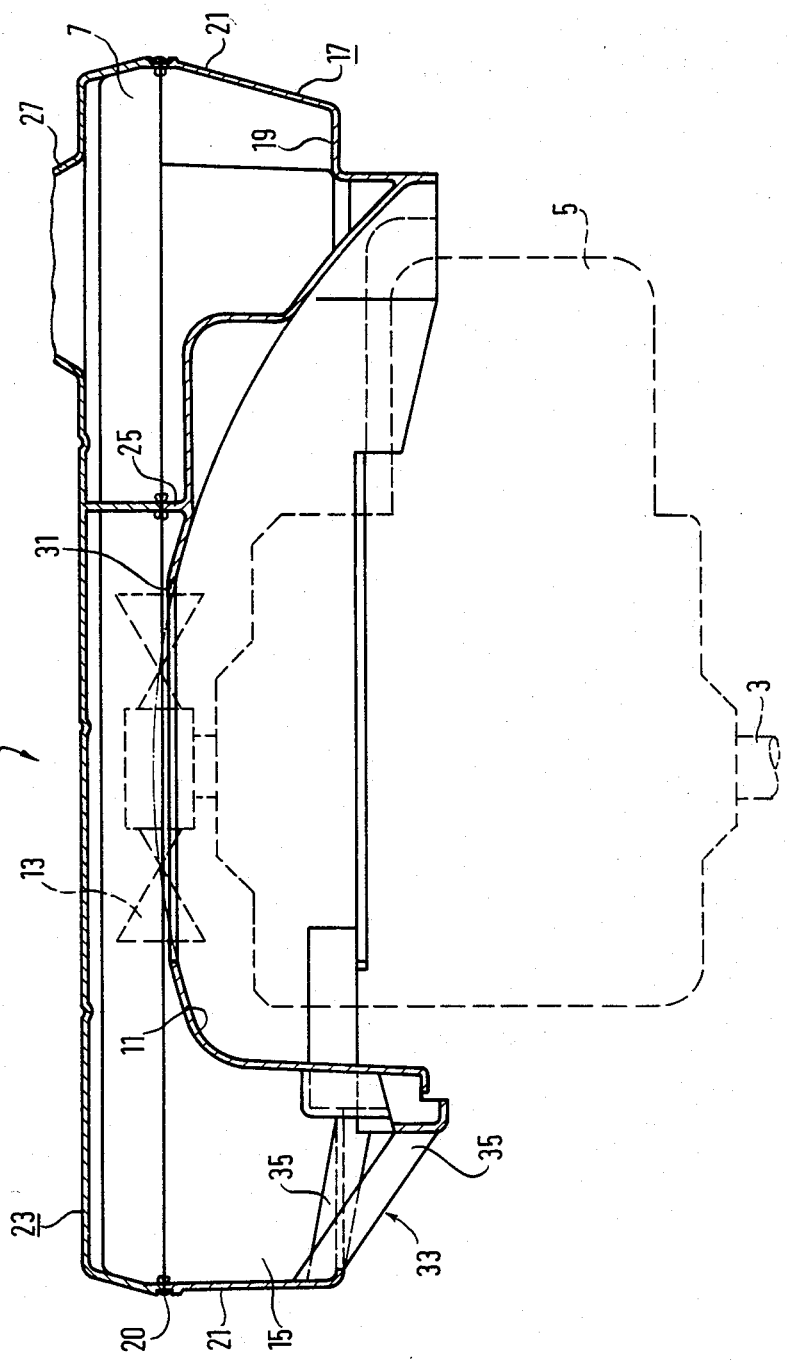

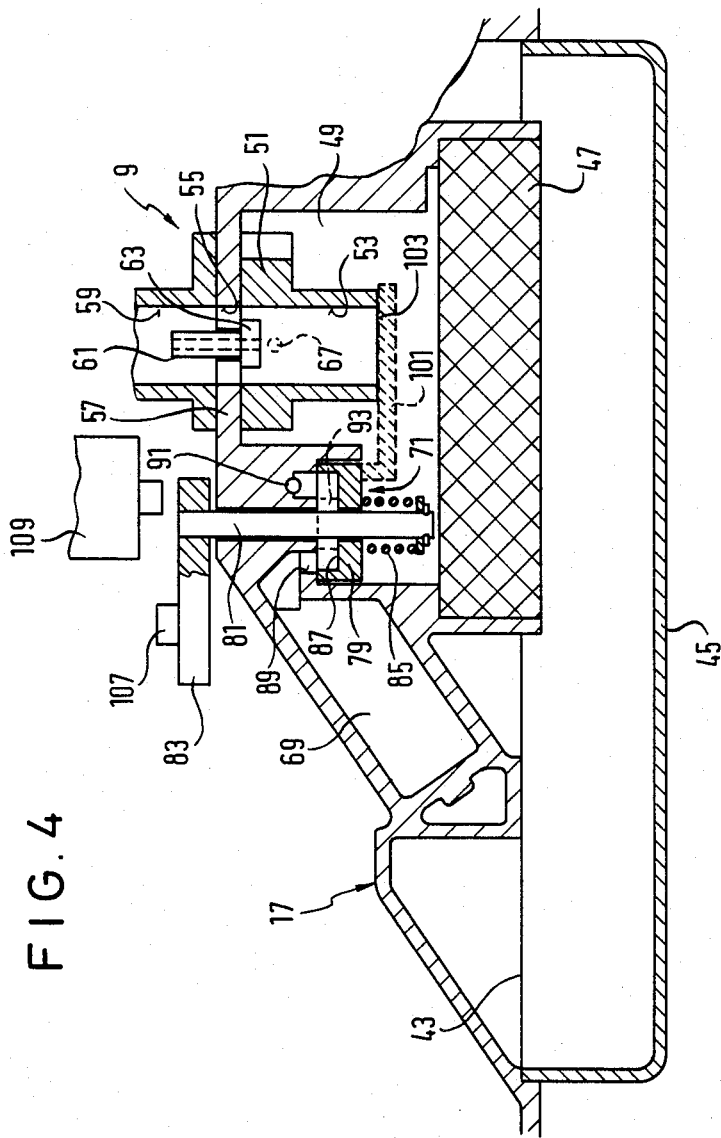

LAWN MOWER

BACKGROUND OF THE INVENTION

The invention relates to a lawn mower having a vertical cutter shaft driven by an internal combustion engine.

Conventional lawn mowers of this kind have a fuel tank which is connected by a fuel conduit in the form of a flexible pipe or the like with the carburettor of the internal combustion engine. The carburettor comprises an air intake passage into which a fuel nozzle opens in the usual way. On the upper side of the internal combustion engine a cooling fan wheel is arranged which is accommodated in a fan housing which covers over at least a part of the internal combustion engine from above.

Ordinarily the fan housing, the fuel tank, the carburettor and possibly a suction silencer are produced as separate components and secured individually on the upper side of the internal combustion engine. This is relatively expensive since the carburettor must be attached to the fuel tank through separate flexible conduits.

It is an object of the invention to reduce the production expense of a lawn mower of the initially stated kind.

SUMMARY OF THE INVENTION

In accordance with the invention this object is achieved in that the fan housing, the fuel tank and the carburettor, which is connected through the fuel supply conduit with the fuel tank, together with its fuel nozzle are connected into a unit which can be handled separately and are securable as a unit to the internal combustion engine, and in that at least the fan housing, the fuel tank and the fuel conduit between the carburettor and the fuel tank consist of synthetic plastics material and are inseparately assembled into a single synthetic plastics moulding.

The construction unit formed for example as an injection moulding can be assembled independently of the internal combustion engine and the other components of the lawn mower. The construction unit comprises all the fuel-supplying components, especially the components of the carburettor at least including the fuel nozzle, and can therefore be tested for correct operation and liquid-tightness before attachment to the lawn mower. Since the fuel passage is formed integrally on the synthetic plastics moulding, no additional flexible pipes or the like are necessary which frequently led to faults in operation in conventional lawn mowers.

In a preferred form of embodiment a fuel shut-off valve is likewise a component of the construction unit. The shut-off valve inserted into the fuel passage preferably comprises a valve body which is arranged laterally of a section of the air intake passage of the carburettor leading through the synthetic plastics moulding, and is mounted rotatably on the synthetic plastics moulding. The valve body carries a choke flap which controls the opening cross-section of the intake passage. This measure reduces the number of the control elements of the lawn mower, since in one of the end positions of the choke flap the fuel supply to the internal combustion engine is shut off.

The choke flap is preferably connected with the valve body such that when the shut-off valve is closed it clears the opening cross-section of the air intake passage and when the shut-off valve is fully opened it is adjustable between a position clearing the opening cross-section of the air intake passage and a position closing the opening cross-section. This embodiment provides that on the one hand the fuel tap is automatically opened when the engine is started and on the other hand the fuel tap is automatically closed when the engine is shut off, whereby operation is considerably simplified.

The valve body is preferably mounted on the synthetic plastics moulding rotatably about an axis approximately parallel with the axis of the air intake passage section and carries as choke flap a segment disc which on rotation of the valve body is pivotable in front of an air inlet opening of the air intake passage. The segment disc is thus arranged outside the air intake passage, which facilitates the assembly of the carburettor and simplifies the design of the carburettor so that its housing can be extensively incorporated into the synthetic plastics moulding.

A further measure which reduces the construction expense and simplifies operation consists in that the valve body is connected with an actuating element for an ignition control switch of the internal combustion engine which places the switch into a first position switching off the ignition when the shut-off valve is closed and into a second position switching on the ignition when the shut-off valve is opened. The use of an ignition control switch controllable together with the shut-off valve is advantageous especially in forms of embodiment in which the choke flap coupled with the shut-off valve clears the intake passage cross-section when the shut-off valve is closed. In these forms of embodiment the ignition can be switched off before the shut-off valve reaches its closed position.

The choke flap and the valve body can be fitted together with a draw cable actuating lever on a common shaft mounted rotatably in the synthetic plastics moulding. The actuating lever can be provided with a dog for actuating the ignition control switch of the internal combustion engine. The ignition control switch can be a short-circuit switch which short-circuits the ignition of the internal combustion engine.

In a preferred form of embodiment the carburettor comprises beneath the shut-off valve a float housing fitted detachably to the synthetic plastics moulding and enclosing a vertically movable float. The synthetic plastics moulding carries a seating of a needle valve actuated by the float which controls a fuel passage formed into the synthetic plastics moulding. Thus the float valve is likewise a component of the construction unit and can be tested for correct operation before the unit is attached.

The synthetic plastics moulding expediently comprises a lower shell part with an upwardly facing edge and a partition dividing the fuel tank from the fan housing. A lid part is non-detachably secured in liquid-tight manner, for example stuck or in the case of thermoplastic synthetic plastics materials, welded, to the upwardly facing edge and to the partition of the shell part. The fuel-conducting components, especially the housing of the carburettor and the fuel passage, are integrally formed into the shell part.

In the region of the fan wheel the interspace between the shell part and the lid part is formed as suction silencer. Thus the suction silencer likewise forms an integral component of the unit.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 shows a lateral elevation of an upper housing of a lawn mower, partially in section along a line I—I in FIG. 2;

FIG. 2 shows a horizontal section through the housing along a line II—II in FIG. 1;

FIG. 3 shows a vertical section through the housing along a line III—III in FIG. 2;

FIG. 4 shows a section through a carburettor connected with the housing into a construction unit, along a line IV—IV in FIG. 1 and FIG. 5 shows a section through the carburettor along a line V—V in FIG. 1.

DESCRIPTION OF THE PREFERRED EMBODIMENTS

The Figures show an upper housing 1 of a lawn mower (not shown separately) the vertically extending cutter shaft 3 (FIG. 3) of which is driven by an internal combustion engine 5, which is merely illustrated diagrammatically. The housing 1 covers the upper region of the internal combustion engine 5 and assembles a fuel tank 7, a carburettor 9, a fan housing 11 of a fan wheel 13 arranged about a vertical rotation axis on the top of the internal combustion engine 5, and a suction silencer 15 into a construction unit which can be secured as a unit to the internal combustion engine 5.

The housing 1 consists of a lower shell part 17 having a bottom of substantially concave form towards the internal combustion engine 5 forming the fan housing 11 of spiral form and a tank bottom 19 of the fuel tank 7. On the upper edge 20 of an upwardly protruding circumferential wall 21 of the shell part 17 there is placed a lid part 23 which is concave towards the internal combustion engine 5, which part is fitted in a liquid-tight and inseparable manner, for example welded or stuck, along the entire edge 20. A partition 25 formed by ribs of the shell part 17 and of the lid part 23 limits the fuel tank 7 from the fan wheel 13. The lid part 23 carries a fuel filler pipe 27 which is closed with a removable screw cap 29.

The suction silencer 15 is formed by the interspace between the shell part 17 and the lid part 23. The fan wheel 13 extends through an opening 31 of the spiral fan housing 11 into the interspace and draws air into the suction silencer 15 through air suction openings 33 on the side of the fan wheel 13 remote from the fuel tank 7. The air passes out through the opening 31 and is distributed by the fan housing 11 of spiral form on the upper side of the internal combustion engine 5. The openings 33 are provided on the underside of the shell part 17 and lattice bars 35 limit the opening cross-section and hinder the intake of foreign bodies.

The carburettor 9 is arranged laterally of the fuel tank 7 and of the suction silencer 15. A vertial partition 37 extending between the shell part 17 and the lid part 23 (FIG. 2) together with the circumferential wall of the housing defines an air intake passage 39 for the combustion air of the internal combustion engine 5. The air intake passage 39 starts from an air suction opening 41 in the region of the air suction openings 33 and issues through a passage opening 43 of the shell part 17 in a lid held detachably on the shell part 17. This lid distributes the combustion air over the surface of an air filter pad 47. The air filter pad 47 closes the air inlet side of a carburettor chamber 49 which is formed into the shell part 17. In the carburettor chamber 49 there is seated a jet assembly 51 cast for example from aluminum. The jet assembly 51 comprises an air intake pipe section 53 which is in communication through an opening 55 in a wall 57 of the shell part 17 adjacent to the internal combustion engine 5 with an air suction passage 59 of the internal combustion engine 5. Into the air suction passage 59 there extends a fuel nozzle 61 formed on the jet assembly 51. The air suction pipes 53 and 59 form a Venturi nozzle which atomizes the fuel issuing from the fuel nozzle 61. An orifice 63 arranged in the air suction pipe 53 improves the atomization effect. A float housing 65 is attached with snap fastenings (not shown) beneath the carburettor chamber 49 and into it there extends a fuel pipe 67 formed on the jet assembly 51 and connected with the fuel jet 61. The suction generated by the internal combustion engine 5 draws the fuel through the nozzle 61 and the fuel pipe 67 out of the float housing 65.

The fuel is introduced into the float housing 65 by way of a fuel passage 69 formed in the shell part 17, a shut-off valve 71 held on the shell part 17 and a float valve 75 actuated by a float 73. The fuel passage 69 opens into the fuel tank 7, its opening being covered by a filter 77 (FIG. 2). The shut-off valve comprises a sealed valve body 79 which is held fast in rotation but axially displaceably on a shaft 81 in a manner not further illustrated. The shaft 81 is mounted rotatably in the shell part 17 and carries fixed on its end remote from the valve body 79 and actuating lever 83 which is coupled through a draw cable (not illustrated) or the like with an operating handle of the lawn mower. A compression spring 85 presses the valve body 79 against its valve seat formed on the shell part 17. The valve body 79 contains a connecting passage 87 which in a rotation angle range for example of 90° connects an outlet opening 89 of the fuel passage 69 with a connecting passage 91 leading to the float valve 75. When the valve body 79 is in a closed position a closure piece 93 blocks the connection between the outlet opening 89 and the connection passage 91.

The float valve 75 arranged beneath the connection passage 91 comprises a valve seating 95 held on the shell part 17 and closable by a needle 97. The needle 97 is controlled by the float 73 which surrounds the fuel pipe 67 and is mounted for pivoting about a horizontal axis 99 on the shell part 17. The float 73 in this way keeps the fuel level in the float housing 65 constant.

The shaft 81 extends approximately parallel with the air intake pipe 53. On the valve body 79 there is fitted a segment disc 101 serving as choke flap which on rotation of the valve body 79 is pivoted in front of the opening 103 of the air intake pipe 53 facing the air filter pad 47. An aperture 105 of the segment disc prevents complete closure of the pipe cross-section and defines the starting air quantity. The segment disc (choke flap) 101 is fitted so that three operating positions are possible (a) when the shut-off valve 71 is closed (stop position), the opening cross-section of the air intake pipe 53 is cleared by the segment disc 101 (FIG. 1)

(b) when the shut-off valve 71 is fully opened, the opening cross-section of the air intake pipe 53 is first kept open (c) and then reduced up to closure of the opening cross-section.

FIG. 4 shows the segment disc 101 in chain lines in an operating position of the internal combustion engine in which it variably reduces the opening cross-section of the air intake pipe 53. The controlling of the choke flap position is effected by means of the actuating lever 83. Moreover on the actuating lever 83 a dog 107 is fitted which in the shut-off position, or shortly before the shut-off position is reached, actuates an ignition control switch 109 which switches off the ignition of the internal combustion engine. The dog 107, connected to the actuating lever 83, places the ignition control switch 109 into a first position switching off the ignition when the shut-off valve 71 is closed and into a second position switching on the ignition when the shut-off valve 71 is open. In this way the power control and switching off of the internal combustion engine can be controlled by means of one single operating lever of the lawn motor.

While specific embodiments of the invention have been shown and described in detail to illustrate the application of the inventive principles, it will be understood that the invention may be embodied otherwise without departing from such principles.

What is claimed is:

1. Lawn mower comprising:
   (a) a vertical cutter shaft 3, an internal combustion engine 5 for driving said vertical cutter shaft,
   (b) a monolithic first shaped plastics part 17 in the form of a shell positioned above the top of said internal combustion engine 5, said part 17 including a bottom, a circumferential wall 21 extending upwardly from said bottom, and a partition 25 dividing the interior of said part 17 into a fuel tank 7, an air intake chamber 11, 15, 39, air suction opening 33, 41 and air passage openings 31, 43 in said air intake chamber 11, 15, 39, and a fuel duct 69 extending downwardly from said fuel tank 7 and having a lower outlet opening 95,
   (c) monolithic second shaped plastics part 23 positioned on and above said first shaped plastics part 17, said second part 23 secured in a liquid-tight and inseparable manner to said first shaped plastics part along said circumferential wall 21 and said partition 25,
   (d) a fan wheel arranged on the upper side of said internal combustion engine 5 for drawing air from said air intake chamber 11, 15, 39 arranged on the upper side of the internal combustion engine, and said fan wheel is driven about a vertical axis of rotation by said internal combustion engine 5,
   (e) a carburetor 9 having an intake pipe body 51 attached to said fuel duct 69 in said first shaped plastics part 17, said carburetor comprising a fuel nozzle 63, a float valve arrangement fastened to said first shaped plastics part and controlling the lower outlet opening 95 of said fuel duct 69,
   (f) a cover part removably mounted on said first shaped plastics part 17, said cover part together with said first shaped plastics part 17 forming an air intake duct which connects said air intake chamber 11, 15, 39 with said intake pipe body 51,
   (g) an air filter arranged in said air intake duct formed by said cover part 45 and said first shaped plastics part 17, and
   (h) a shut-off valve 71 located in said fuel duct 69, said shut-off valve 71 having a valve body 79 rotatably mounted on said first shaped plastics part 17.

2. Lawn mower, as set forth in claim 1, wherein a choke flap 101 is connected to and rotatable with said valve body 79 of said shut-off valve, and said choke flap 101 controls the cross-sectional area of the opening of said intake pipe body 51.

3. Lawn mower, as set forth in claim 2, wherein said choke flap 101 is connected to said valve body 79 so that when said shut-off valve is closed said choke flap 101 releases the cross-section area of the opening of said intake pipe body 51, and when said shut-off valve is fully open, said choke flap 101 is adjustable between a position releasing the cross-sectional area of the opening and another position closing the cross-sectional area of the opening.

4. Lawn mower, as set forth in claim 2, wherein said valve body is mounted on said first shaped plastics part 17 for rotation about an axis of a shaft 81 extending approximately parallel to the axis of said intake pipe body 51, and said choke flap on said valve body comprises a segment disc 101 arranged so that upon rotation of said valve body 79, said segment disc is pivotally displaced in front of an air intake opening in said intake pipe body 51.

5. Lawn mower, as set forth in claim 1, including an actuating element 107 for an ignition control switch 109 of the internal combustion engine is connected to said valve body, said actuating element 107 is arranged for placing said switch 109 into a first position switching off the ignition when said shut-off valve 71 is closed and into a second position switching on the ignition when said shut-off valve is open.

6. Lawn mower, as set forth in claim 2, wherein a shaft 81 is approximately parallel to the axis of said intake pipe body 51 and is rotatably mounted in said first shaped plastics part 17, said valve body is connected to one end of said shaft so that it is rotatable with said shaft, and said choke flap on said valve body 79 comprises a segment disc 101 so that upon rotation of said valve body 79 said segment disc 101 is pivotally displaced in front of an air inlet opening in said air intake duct 53, and an actuating lever 83 connected to the other end of said shaft 81.

7. Lawn mower, as set forth in claim 6, wherein a dog 107 is secured to said actuating lever 83 for actuating an ignition control switch 109 of said internal combustion engine 5, said dog 107 places said switch 109 into a first position switching off the ignition when said shut-off valve 71 is closed and into a second position switching on the ignition when said shut-off valve is open.

8. Lawn mower, as set forth in claim 1, wherein said float valve arrangement 75 of said carburetor includes a float housing 65 positioned below said shut-off valve 71 and removably secured on said first shaped plastics part 17, a vertically movable float 73 enclosed within said float housing 65, a needle valve 75, said first shaped plastics part forms a seat for said needle valve at the outlet opening of said fuel duct, and said needle valve is actuated by said float 73.

9. Lawn mower, as set forth in claim 1, wherein said first shaped plastics part 17 surrounding said fan wheel is formed as a spiral shell concave toward said internal combustion engine 5, the center of said spiral shell forming an air passage opening 31, and said air intake openings 33 are located on the side of said fan wheel 13 facing away from said partition 25 and said air intake openings 33 are connected to said air passage opening 31 of said spiral shell via a chamber 15 of said air intake chamber, and said chamber 15 forms a silencer for the noises from said air intake.

* * * * *